(No Model.)
W. E. JAQUES.
DOOR HANGER.
No. 302,847. Patented July 29, 1884.
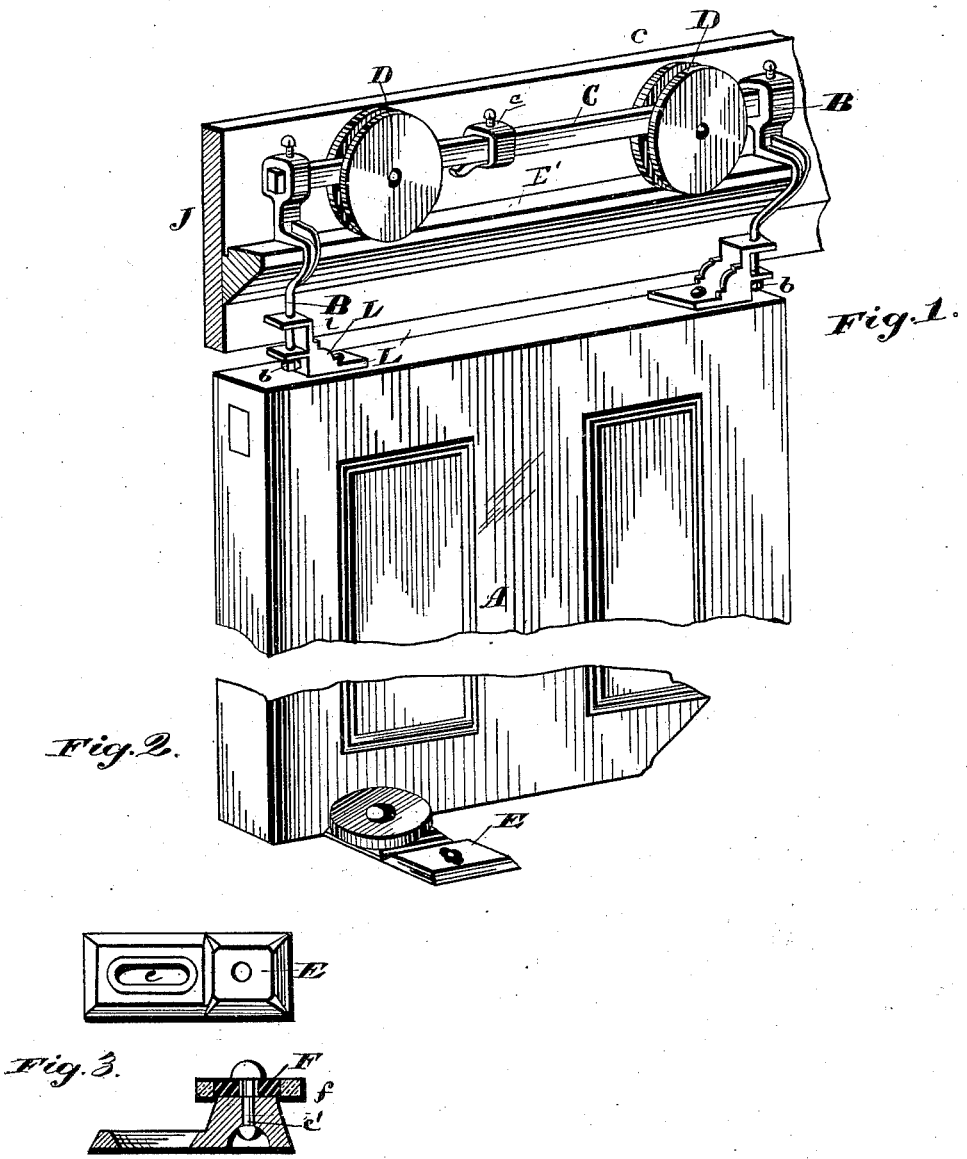
WITNESSES
INVENTOR

UNITED STATES PATENT OFFICE.

WILLIAM E. JAQUES, OF CLEVELAND, OHIO, ASSIGNOR TO MARY K. JAQUES, OF SAME PLACE.

DOOR-HANGER.

SPECIFICATION forming part of Letters Patent No. 302,847, dated July 29, 1884.

Application filed March 3, 1884. (No model.)

*To all whom it may concern:*

Be it known that I, WILLIAM E. JAQUES, of Cleveland, in the county of Cuyahoga and State of Ohio, have invented new and useful Improvements in Attachments for Sliding Doors; and I do hereby declare the following to be a full, clear, and exact description of the invention, such as will enable others skilled in the art to which it pertains to make and use the same.

My invention relates to attachments for sliding doors, the object being to provide such supporting-rollers and attachments and guiding-rollers and stops that the doors may be moved easily and noiselessly.

With these objects in view my invention consists in certain features of construction and in combination of parts hereinafter described, and pointed out in the claims.

In the accompanying drawings, Figure 1 is a view in perspective of a sliding door with my improved mechanism attached. Fig. 2 is a plan view of the plate to which the guiding-roller is secured; and Fig. 3 is a view in vertical longitudinal section of said plate and roller.

A represents a door supported by the arms B, embracing and adjustably secured to the bar C, that rests upon the shafts connecting, respectively, the two pairs of wheels D. These wheels have each an outside flange, so that the flanges of each pair of wheels embrace the track E', and are guided thereby. The arms B are bent, as shown, so as not to come in contact with the track, and at the same time to support the door laterally in a central position under the wheels. The lower portion of the arms B are round in cross-section, and threaded at the bottom, and provided with the nut $b$. This portion of the arm passes through ears $l$ on the part L. This part L terminates in a flat plate, L', that is adapted to be screwed to the top edge of the door for supporting the same.

By means of the nut $b$ the door may be adjusted vertically, and by means of the loose joint or connection between the arms B and the part L all cramping of the parts is avoided. As the wheels D roll on the track and the bar C rolls on the said shafts, the movement of these parts will be about frictionless. By reason of the large size of the wheels D as compared with the size of the shaft that supports the bar C, the wheels will roll along the track and carry the door the required distance while the bar C moves only a short distance on the said shaft. The wheels, therefore, may be operated very near the arms B without coming in contact with them. The door will therefore always be nearly evenly balanced on the two sets of wheels. Adjustable stops $c$ may be secured to the bar C, so as to butt against the shafts in case the wheels become misplaced. When this occurs, the bar C will be compelled to slide on the shaft; but the wheels by this means will be returned to their proper position.

These attachments are designed more especially for parlor-doors, that usually roll back into a pocket in the partition. A lintel similar to that shown at J at the rear, and to which the track is attached, is also provided in front, so that the entire mechanism thus far described is concealed. The doors require some guiding device at the bottom, so that they will not come in contact with the casings. For this purpose I employ rolls that are secured to the floor close to the casing, arranged so as to engage the door near the bottom on either side, and are constructed as follows:

E is a metal plate provided with a slot, $e$, through which passes the screw that fastens it to the floor. By means of this slot the plate E may be adjusted to or from the door. This plate is provided with an upright spindle, $c'$, upon which is mounted the roller that engages the door. The inner part, F, of this roller is of brass, and the outer part, $f$, of rubber. By means of this construction the roller is made durable and operates noiselessly. The doors are limited in their movements by suitable stops secured to the floor or to any other convenient part of the building. In case of double doors a single stop in the center answers for both doors at this point. These stops are constructed as follows:

G are metal blocks, recessed as shown, and set in pairs, with the recessed sides facing each other at suitable points in the horizontal casings at the top of the door. These blocks support the block H, that receives the thrust of the door. The block H is recessed at each corner, and inlaid with strips of rubber, $h$, that engage the walls of the chambers in the blocks G, so that when a door butts the block H from either side the elasticity of the rubber prevents any jarring or any noticeable noise.

I am aware that is is not new to hang a door from a bar supported on rollers moving on a trackway, and also that it is not new to secure the bar to the door by adjustable standards, and hence I make no broad claim thereto; but

What I claim is—

1. In an attachment for sliding doors, the crooked arms B, embracing and adjustably secured to the bar C, and pivotally secured to the part L, that is adapted to be secured to the top edge of the door, and provided with a screw end and the nut $b$, by means of which the door may be adjusted vertically, substantially as set forth.

2. In an attachment for sliding doors, the combination, with the wheels D, the bar C, and a door suspended from the bar, of the stop $c$, adjustably secured on the bar between the wheels, substantially as set forth.

In testimony whereof I sign this specification, in the presence of two witnesses, this 1st day of February, 1884.

WILLIAM E. JAQUES.

Witnesses:
  CHAS. H. DORER,
  ALBERT E. LYNCH.